United States Patent
Lee et al.

(10) Patent No.: US 7,492,892 B2
(45) Date of Patent: Feb. 17, 2009

(54) SLIDE OPENING/CLOSING TYPE MOBILE DEVICE

(75) Inventors: Dong-woo Lee, Seoul (KR); Young-ki Kim, Yongin-si (KR); Ki-taek Kim, Yongin-si (KR); Dong-ok Kwak, Suwon-si (KR); Seong-woon Booh, Yongin-si (KR); Jin-woo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 11/256,168

(22) Filed: Oct. 24, 2005

(65) Prior Publication Data
US 2006/0154704 A1 Jul. 13, 2006

(30) Foreign Application Priority Data
Jan. 7, 2005 (KR) .................. 10-2005-0001770

(51) Int. Cl.
*H04M 1/00* (2006.01)
*H04M 9/00* (2006.01)
(52) U.S. Cl. ................. 379/433.12; 455/575.4
(58) Field of Classification Search ........... 379/433.11, 379/433.12, 433.13; 455/90.3, 575.1, 575.4
See application file for complete search history.

(56) References Cited
U.S. PATENT DOCUMENTS
7,136,688 B2 * 11/2006 Jung et al. ............ 455/575.4
2005/0107137 A1 * 5/2005 Byun et al. ............ 455/575.1

FOREIGN PATENT DOCUMENTS
KR 20-0345703 Y1 3/2004
KR 10-2004-0097511 A 11/2004

* cited by examiner

*Primary Examiner*—Curtis Kuntz
*Assistant Examiner*—Tuan D Nguyen
(74) *Attorney, Agent, or Firm*—Sughrue Mion, PLLC

(57) ABSTRACT

A slide opening/closing type mobile device includes a body section including a guide section that has a pair of long holes and is configured so that an interval between the pair of long holes becomes smaller at first, as it goes from one ends towards the other ends of the long holes, and then, becomes larger based on certain starting points; a slider provided with guide rollers movably inserted in the pair of long holes of the guide section in a state of being elastically biased to the outside; a rotation plate rotatably mounted on the slider; and a display section mounted on the rotation plate. The display section is slidable upward and downward with respect to the body section by the slider, and rotates at a predetermined angle by the rotation plate.

18 Claims, 5 Drawing Sheets

SLIDE OPENING/CLOSING TYPE MOBILE DEVICE

This application claims priority under 35 U.S.C. § 119 from Korean Patent Application No. 2005-01770, filed on Jan. 7, 2005, the entire content of which is incorporated herein by reference.

BACKGROUND OF THE INVENTION

1. Field of the Invention

The present invention relates to a mobile device and, more particularly, to a slide opening/closing type mobile device.

2. Description of the Related Art

Mobile devices, such as a PCS, a cellular phone, or a PDA, are classified into a bar-type device, a flip-type device, a folder-type device, and a slide-type device.

The folder-type mobile device is configured so that a folder is allowed to be opened when the device is used, or closed when the device is carried, thus overcoming a problem of long length caused in the bar-type or flip-type device, but it has another problem of causing a hinge section connecting an upper folder and a lower folder to be easily damaged.

To solve the above-mentioned problems of the folder-type mobile device, a slide opening/closing type mobile device has been developed. The slide opening/closing type mobile device comprised of a display section and a body section operates in such a manner that when the display section moves upward by overlapping with the body section, a mode of the device is converted into a non-standby mode, and when the display section moves downward, a mode is converted into a standby mode.

The entire length of a slide opening/closing type mobile device can be diminished and a display screen can be viewed instantly regardless of whether the device is opened or closed.

In the mean time, as the IT industry has been developed rapidly in recent times, a mobile device, such as a cellular phone or a PDA, has been in wide use with not only a simple function, like a voice communication with the other party, but also more various functions, like a function to view photos and motion pictures, a camera and camcorder function, an electronic note and electronic calculator function, etc.

Especially, as mobile technology makes rapid progress, users can have an environment in which multimedia services, such as movies and music videos, are provided through a mobile device anytime anywhere. Thus, a mechanical construction of a mobile device is needed so that users do not feel inconveniences in using such various services.

Examining an existing mobile phone from this point of view, the sliding mechanism in an existing slide-type mobile phone is complex and reducing the size of an existing mobile phone is difficult.

Furthermore, with an existing slide-type mobile phone, photos or motion pictures having length larger than width are inconvenient to view, thus not meeting the demands of its users who want a wide and clear screen by adjusting themselves to IMT 2000 communication services.

SUMMARY OF THE INVENTION

The present invention has been developed in order to solve the above drawbacks and other problems associated with the conventional arrangement. It is an aspect of the present invention to provide a slide opening/closing type mobile device which is miniaturized using a simple and small sliding mechanism.

It is another aspect of the present invention to provide a slide opening/closing type mobile device capable of implementing a wide screen by rotating a display when performing a multimedia function, such as motion pictures, while using other mobile device functions at normal times.

According to an aspect of the present invention for achieving the objects, there is provided a slide opening/closing type mobile device comprising: a body section provided with a keypad for inputting information; a display section provided with a display for displaying input information; and a slider unit for slidably connecting the display section with respect to the body section.

The slider unit comprises: a slider mounted on one of the body section and the display section and provided with a pair of guide rollers; a guide section mounted on the other one of the body section and the display section and provided with a pair of long holes, accommodating the pair of guide rollers.

The pair of guide rollers is elastically biased to the outside, and the guide section may be configured so that an interval between the pair of long holes becomes smaller at first, as it goes from one ends A1 towards the other ends A2 of the long holes, and then, becomes larger based on certain starting points A0.

Though the starting points A0 may be determined to a point about ½ of the long holes, it may be changeable to, for example, a point about ⅓ of the long holes.

According to an exemplary embodiment of the present invention, the slider comprises: a pair of load members having one ends each vertically connected to the pair of guide rollers; a container member which is hollow and has both sides at which holes through which the other ends of the load members pass are formed; and an elastic member for elastically supporting the pair of load members to the outside in the container member.

Stoppers for preventing the load member from being separated from the container member may be respectively connected to the pair of load members.

The elastic member may be a compression coil spring.

According to another aspect of the present invention, there is provided a slide opening/closing type mobile device comprising: a body section comprising a pair of long holes arranged lengthwise; a slider provided with guide rollers accommodated in the pair of long holes and slidable with respect to the body section; a rotation plate rotatably mounted on the slider; and a display section mounted on the rotation plate.

The pair of guide rollers is elastically biased to the outside, and the guide section may be configured so that an interval between the pair of long holes becomes smaller at first, as it goes from one ends A1 towards the other ends A2 of the long holes, and then, becomes larger based on certain starting points A0.

And the starting points A0 may be determined to a point about ½ of the long holes, and the slider comprises: a pair of load members having one ends each vertically connected to the pair of guide rollers; a container member which is hollow and has both sides at which holes through which the other ends of the load members pass are formed; and an elastic member for elastically supporting the pair of load members to the outside in the container member.

According to still another aspect of the present invention, there is provided a slide opening/closing type mobile device comprising a body section including a guide section that has a pair of long holes arranged lengthwise and is configured so that an interval between the pair of long holes becomes smaller at first, as it goes from one ends A1 towards the other ends A2 of the long holes, and then, becomes larger based on certain starting points A0; a slider provided with a pair of guide rollers slidably inserted in the pair of long holes in a state of being elastically biased to the outside; and a display section mounted on the slider.

BRIEF DESCRIPTION OF THE DRAWINGS

The above aspects and features of the present invention will be more apparent by describing certain embodiments of the present invention with reference to the accompanying drawings, in which.

Figure 1A:
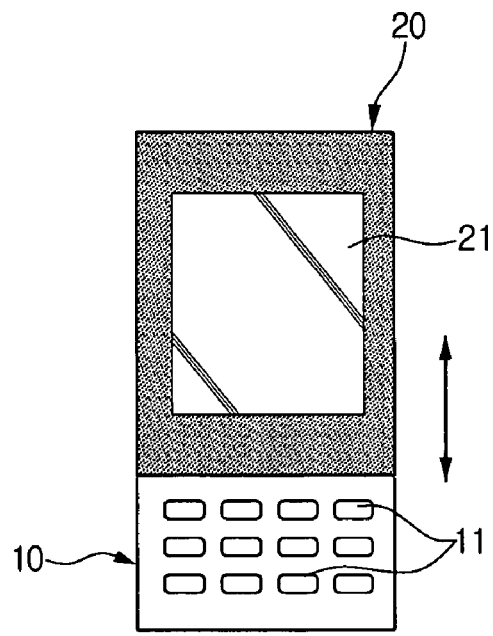
FIGS. 1A and 1B are a front view and a side view illustrating the schematic structure of a slide opening/closing type mobile device according to one embodiment of the present invention.

DETAILED DESCRIPTION OF ILLUSTRATIVE, NON-LIMITING EMBODIMENTS OF THE PRESENT INVENTION

Certain embodiments of the present invention will be described in greater detail with reference to the accompanying drawings.

In the following description, same drawing reference numerals are used for the same elements even in different drawings. The matters defined in the description such as a detailed construction and elements are provided only to assist in understanding of the invention. Thus, it is apparent that the present invention can be carried out without those defined matters. Also, well-known functions or constructions are not described in detail since they would obscure the invention in unnecessary detail.

Figure 1B:
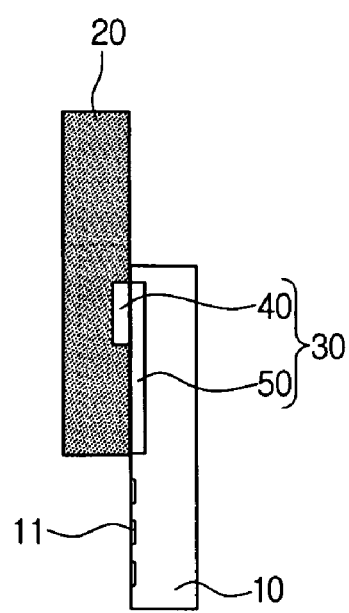

Referring to FIGS. 1A and 1B, in a slide opening/closing type mobile device according to the present invention, a body section 10 and a display section 20 are slidably connected by a slider unit 30. The body section 10 is provided with a keypad 11 for inputting information, and the display section 20 is provided with a display 21 for displaying input information.

The slider unit 30 includes a slider 40 mounted on the display section 20 and a guide section 50 mounted on the body section 10, wherein the slider 40 and the guide section 50 may be changed with each other in their positions. That is, the slider 40 may be mounted on the body section 10 and the guide section 50 may be mounted on the display section 20.

Figure 2A:
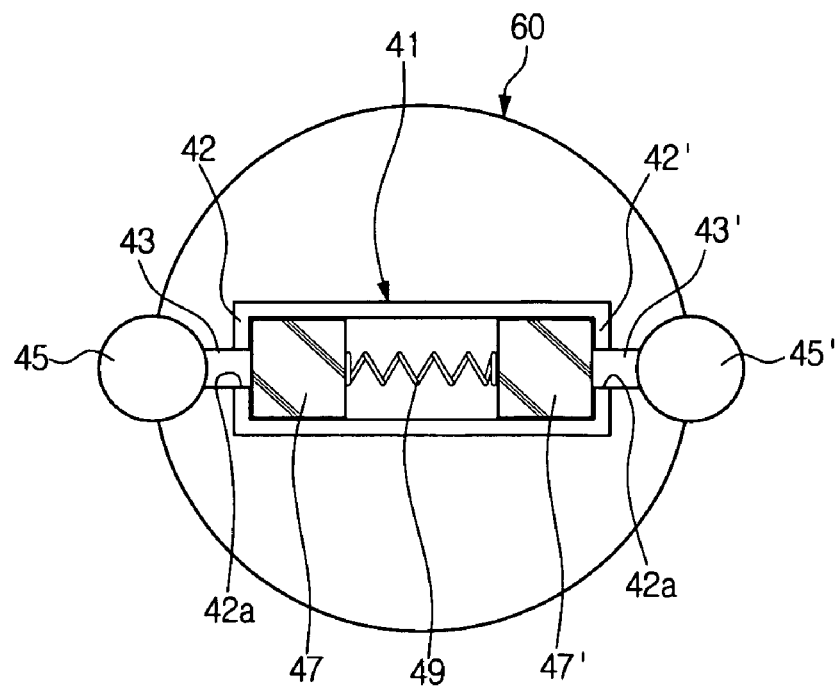
FIGS. 2A and 2B are diagrams illustrating a slider unit of the present invention.
Figure 2B:
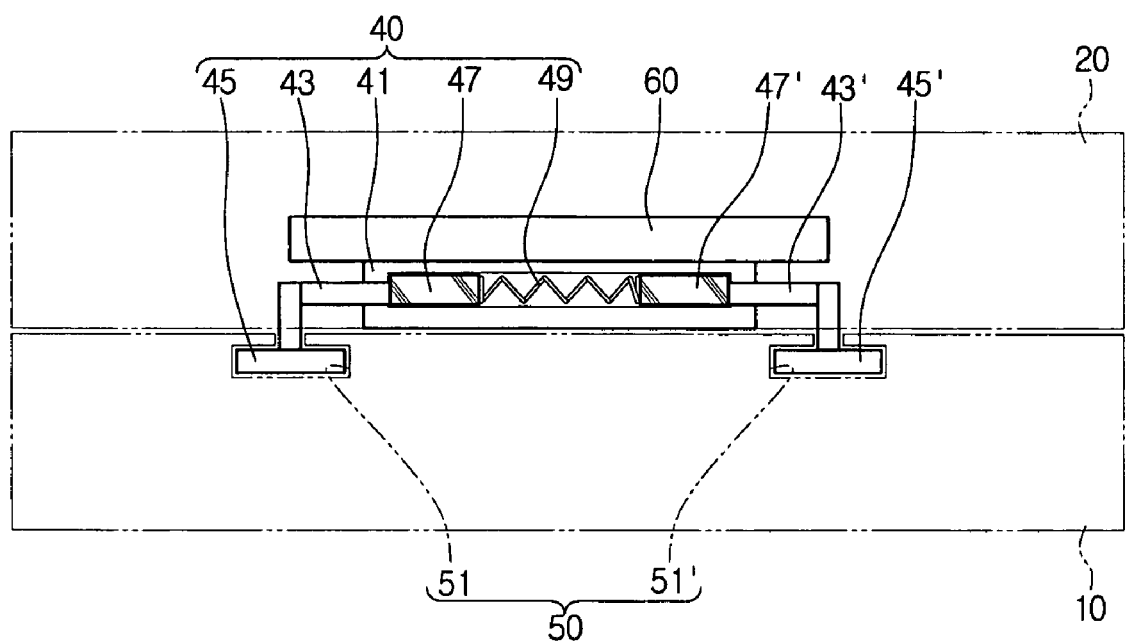
Figure 3:
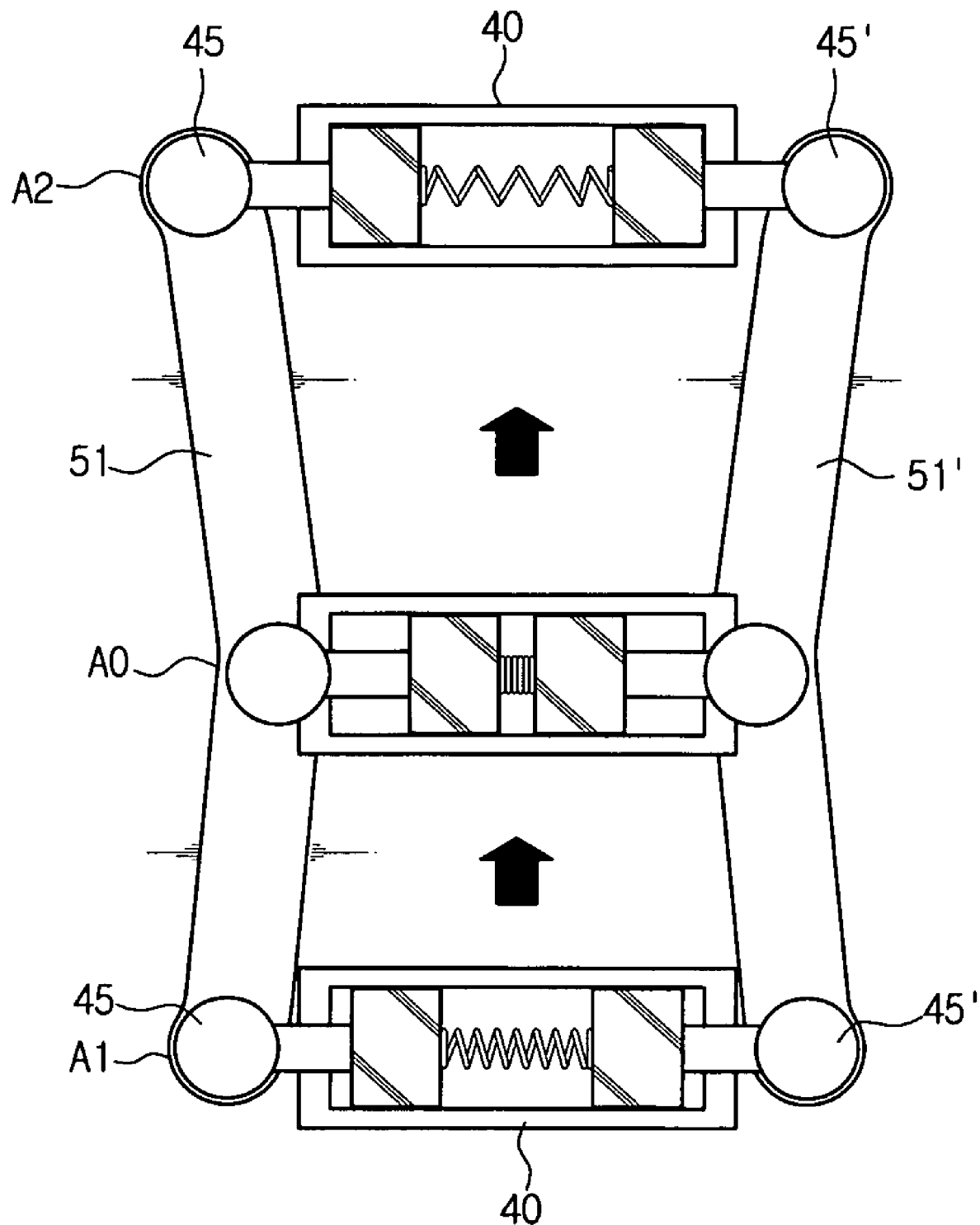
FIG. 3 is a diagram illustrating operations of the slider unit shown in FIG. 2.

As shown in FIGS. 2A, 2B, and 3, the slider 40 includes a container member 41 which is hollow, a pair of load members 43 and 43', a pair of guide rollers 45 and 45', stoppers 47 and 47', and an elastic member 49.

The container member 41 has both sides 42 and 42' at which through holes are formed thereof. The container member 41 can have not only a cylinder shape, as shown, but also other shapes, for example, a shape of an oval or square section, thus the container member 41 is not limited to the shown example.

The pair of load members 43 and 43' are configured so that one ends thereof are located at the outside of the container member 41 and the other ends thereof at the inside of the container member 41 via through holes 42A respectively formed on both sides 42 and 42' of the container member 41, and are movable inward and outward.

The pair of guide rollers 45 and 45' is respectively connected to each one end of the pair of load members 43 and 43'. In the structure according to the embodiment of the present invention, the guide rollers 45 and 45' are vertically connected to the load members 43 and 43'.

The pair of stoppers 47 and 47' are mounted on the other ends of the pair of load members 43 and 43', whereby the load members 43 and 43' are not fully separated from the container member 41.

The elastic member 49 is adapted to elastically support the pair of load members 43 and 43' in both external directions in the container member 41. The elastic member 49 may be a compression coil spring and disposed between the pair of stoppers 47 and 47'.

The guide section 50 has a pair of long holes 51 and 51' in which the pair of guide rollers 45 and 45' is slidably inserted. The long holes 51 and 51' are formed lengthwise in the body section 10. Meanwhile, according to an aspect of the present invention, the guide section 50 is configured so that an interval between the pair of long holes 51 and 51' becomes smaller at first, as it goes from one ends A1 of the long holes 51 and 51' towards the other ends A2 of the long holes 51 and 51', and then, becomes larger based on certain starting points A0. An interval between the one ends of the long holes 51 and 51' and an interval between the other ends of the long holes 51 and 51' may be almost the same, and the starting points A0 may correspond to a point about ½ of the length of the long holes 51 and 51' (that is, a distance from A1 to A2 of the long holes). However, the starting points A0 may be determined with respect to some other points, for example, a point about ⅓ of the length of the long holes 51 and 51' from the one ends A1 of the long holes.

In the mean time, in FIGS. 2A and 2B, a reference numeral 60 denotes a rotation plate. The rotation plate 60 mounted on the container member 41 of the slider 40 is adapted to rotate clockwise and counterclockwise at a predetermined angle, and is provided with the display section 20.

Accordingly, the display section 20 can move upward and downward in the body section 10 by the slider 40, and rotate clockwise and counterclockwise by the rotation plate 60 in upward and downward moved states.

Hereinafter, referring to FIGS. 3, 4A, 4B, and 4C, operations of a slider opening/closing type mobile device according to the present invention will be described in detail.

Figure 4A:
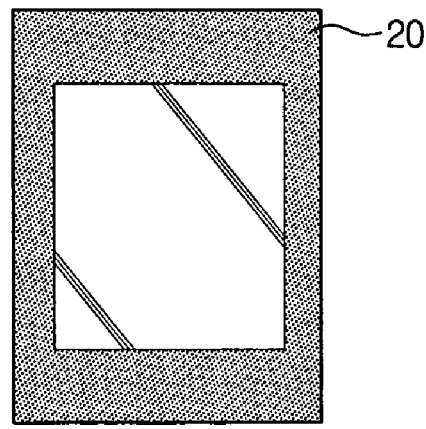
FIGS. 4A, 4B, and 4C are diagrams each showing a standby mode, a non-standby mode, and a display rotation mode of a slider opening/closing type mobile device according to the present invention.

FIG. 4A shows a standby mode in which the guide rollers 45 and 45' provided at both sides of the slider 40 of the display section 20 are positioned at one ends A1 of the long holes 51 and 51'. As the guide rollers 45 and 45' are elastically biased to the outside by the elastic member 49, the display section 20 does not move unless an external force is applied.

In such a situation, when a user pushes the display section 20 upward, the guide rollers 45 and 45' of the slider 40 move along the pair of long holes 51 and 51', and in this case, an interval between the long holes 51 and 51' become smaller, whereby the guide rollers 45 and 45' overwhelm the elasticity of the elastic member 49 to move inward while being compressed.

After the slider 40 moves up to the starting points A0 of the long holes 51 and 51', an interval between the pair of long holes 51 and 51' becomes larger based on the starting points A0, whereby an elastic restoration force of the elastic member 49 is delivered to the guide rollers 45 and 45' through load members 43 and 43' even when a user does not push the display section 20 upward, thereby the slider 40 moves along the long holes 51 and 51'.

Figure 4B:
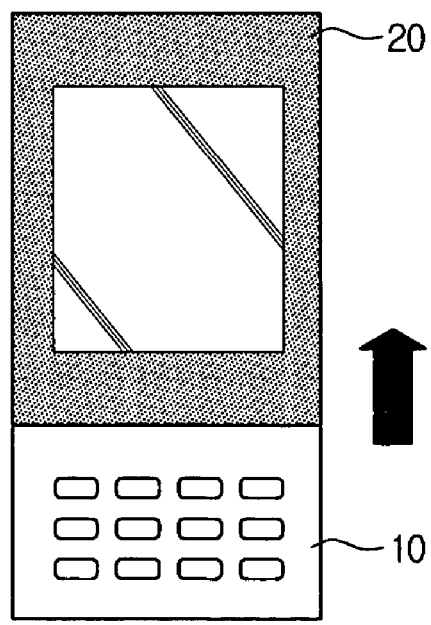

Through the above process, the slider 40 is finally positioned at the other ends A2 of the long holes 51 and 51', of which the state is shown in FIG. 4B as a non-standby mode.

Figure 4C:
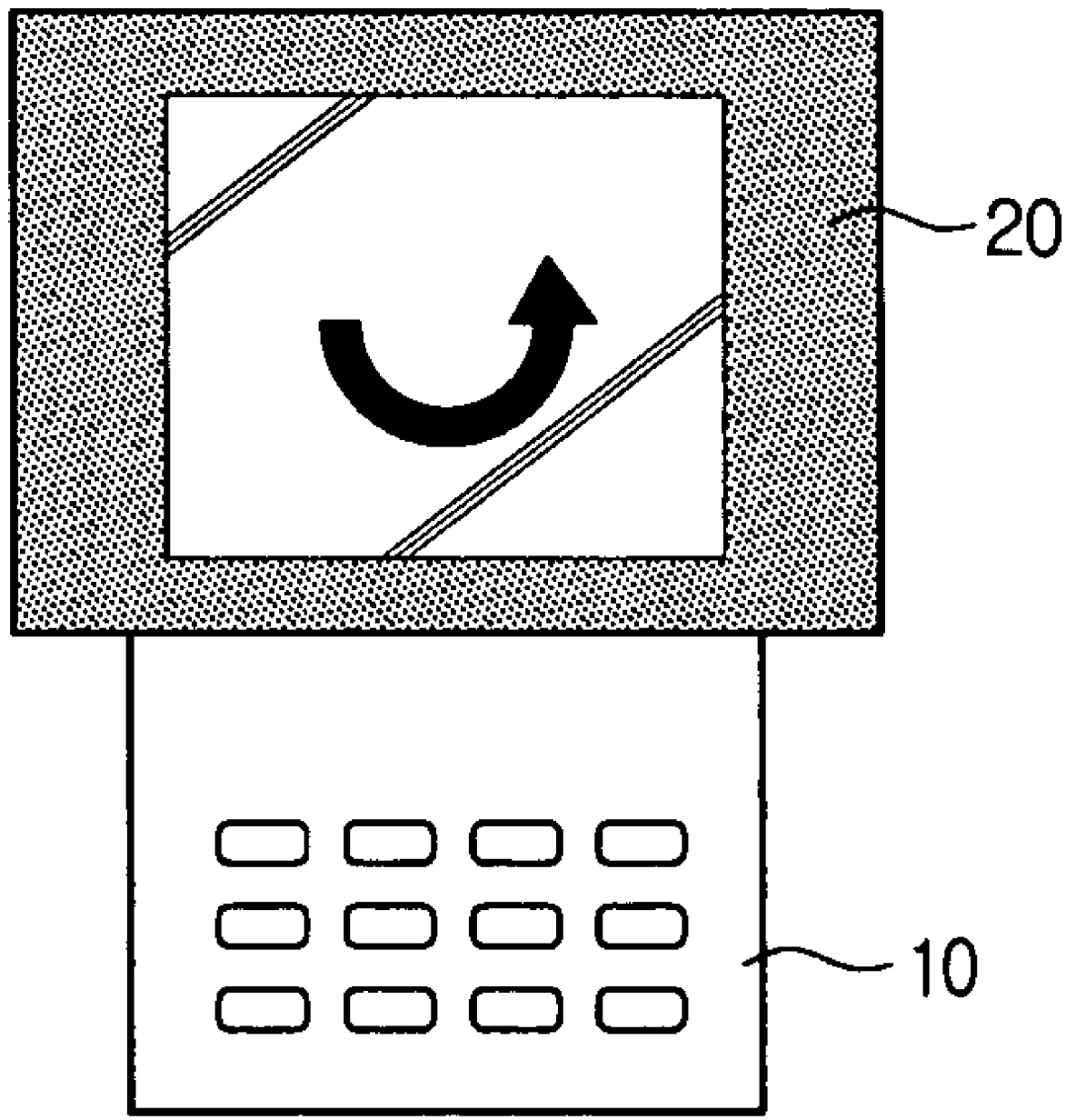

Meanwhile, when rotating the display section 20, e.g., at 90 degrees widthwise in a state the display section 20 is moved upward for a non-standby mode, a wide screen in which width is bigger than length can be implemented, as shown in FIG. 4C.

Thus, a slide opening/closing type mobile device according to the present invention can perform functions, such as a telephone call, at normal times while sliding a display section upward and downward with respect to a body section, and implement wide screen by rotating the display section when utilizing a multimedia function, such as motion pictures.

According to the present invention as seen from the foregoing description, a mobile device which can implement a multimedia function, such as motion pictures, enables its users to view images in wide screen. Accordingly, users are able to view images through a wide and clear screen by adjusting themselves to IMT 2000 communication services, resulting in improving product image and preference.

Furthermore, according to the present invention, a sliding mechanism can be simple and small, thereby providing a lightweight and simple mobile device.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A slide opening/closing type mobile device comprising:
 a body section provided with a keypad for inputting information;
 a display section provided with a display for displaying input information; and
 a slider unit for slidably connecting the display section with respect to the body section, wherein the slider unit comprises:
  a slider mounted on one of the body section and display section and provided with a pair of guide rollers;
  a guide section mounted on an other one of the body section and the display section and provided with a pair of long holes, accommodating the pair of guide rollers,
 wherein the pair of guide rollers are elastically biased away from one another, and the guide section is configured so that along the length of the long holes, an interval between the pair of long holes becomes smaller at first, and then becomes larger beyond a point where the interval is at a minimum.

2. The slide opening/closing type mobile device according to claim 1, wherein the point where the interval between the long holes is at a minimum is positioned at approximately ½ of the length of the long holes.

3. A slide opening/closing type mobile device comprising:
 a body section provided with a keypad for inputting information;
 a display section provided with a display for displaying input information; and
 a slider unit for slidably connecting the display section with respect to the body section, wherein the slider unit comprises:
  a slider mounted on one of the body section and display section and provided with a pair of guide rollers;
  a guide section mounted on an other one of the body section and the display section and provided with a pair of long holes, accommodating the pair of guide rollers,
 wherein the slider comprises:
  a pair of load members having one ends each vertically connected to the pair of guide rollers;
  a container member which is hollow and has both sides at which holes through which other ends of the load members pass are formed; and
  an elastic member for elastically supporting the pair of load members away from one another in the container member.

4. The slide opening/closing type mobile device according to claim 3, wherein the guide section is configured so that along the length of the long holes, an interval between the pair of long holes becomes smaller at first, and then becomes larger beyond a point where the interval is at a minimum.

5. The slide opening/closing type mobile device according to claim 4, wherein stoppers for preventing the load member from being separated from the container member are respectively mounted on the pair of load members.

6. The slide opening/closing type mobile device according to claim 5, wherein the elastic member is a compression coil spring interposed between the pair of stoppers.

7. The slide opening/closing type mobile device according to claim 3, wherein the container member has a cylinder shape.

8. A slide opening/closing type mobile device comprising:
 a body section comprising a pair of long holes arranged lengthwise;
 a slider provided with guide rollers accommodated in the pair of long holes and slidable with respect to the body section;
 a rotation plate rotatably mounted on the slider; and
 a display section mounted on the rotation plate,
 wherein the pair of guide rollers are elastically biased away from one another, and the guide section is configured so that along the length of the long holes, an interval between the pair of long holes becomes smaller at first, and then becomes larger beyond a point where the interval is at a minimum.

9. The slide opening/closing type mobile device according to claim 8, wherein the point where the interval between the long holes is at a minimum is positioned at approximately ½ of the length of the long holes.

10. The slide opening/closing type mobile device according to claim 8, wherein the slider comprises:
 a pair of load members having one ends each vertically connected to the pair of guide rollers;
 a container member which is hollow and has both sides at which holes through which other ends of the load members pass are formed; and
 an elastic member for elastically supporting the pair of load members away from one another in the container member.

11. The slide opening/closing type mobile device according to claim 10, wherein stoppers for preventing the load member from being separated from the container member are respectively mounted on the pair of load members.

12. The slide opening/closing type mobile device according to claim 11, wherein the elastic member is a compression coil spring.

13. The slide opening/closing type mobile device according to claim 10, wherein the container member has a cylinder shape.

14. A slide opening/closing type mobile device comprising:
- a body section including a guide section that has a pair of long holes arranged lengthwise and is configured so that along the length of the long holes, an interval between the pair of long holes becomes smaller at first, and then becomes larger beyond a point where the interval is at a minimum;
- a slider provided with a pair of guide rollers slidably inserted in the pair of long holes in a state of being elastically biased away from one other; and
- a display section mounted on the slider.

15. The slide opening/closing type mobile device according to claim 14, wherein the point where the interval between the long holes is at a minimum is positioned at approximately ½ of the length of the long holes.

16. The slide opening/closing type mobile device according to claim 14, wherein the slider comprises:
- a pair of load members having one ends each vertically connected to the pair of guide rollers;
- a container member which is hollow and has both sides at which holes through which other ends of the load members pass are formed; and
- an elastic member for elastically supporting the pair of load members away from one another in the container member.

17. The slide opening/closing type mobile device according to claim 16, wherein stoppers for preventing the load member from being separated from the container member are respectively mounted on the other ends of the pair of load members.

18. The slide opening/closing type mobile device according to claim 16, wherein the container member has a cylinder shape.

* * * * *